US012064886B1

(12) United States Patent
Terhuja et al.

(10) Patent No.: US 12,064,886 B1
(45) Date of Patent: Aug. 20, 2024

(54) SYSTEMS AND METHODS FOR SCALABLE PERCEPTION AND PURPOSEFUL ROBOTIC PICKING OF ITEMS FROM A COLLECTION

(71) Applicant: Amazon Technologies, Inc., Seattle, WA (US)

(72) Inventors: Vikedo Terhuja, Woburn, MA (US); Chaitanya Mitash, Waltham, MA (US)

(73) Assignee: Amazon Technologies, Inc., Seattle, WA (US)

(*) Notice: Subject to any disclaimer, the term of this patent is extended or adjusted under 35 U.S.C. 154(b) by 318 days.

(21) Appl. No.: 17/209,594

(22) Filed: Mar. 23, 2021

(51) Int. Cl.
  *B25J 9/16* (2006.01)
  *G06T 7/593* (2017.01)
  *G06T 7/73* (2017.01)

(52) U.S. Cl.
  CPC .......... *B25J 9/1697* (2013.01); *B25J 9/1612* (2013.01); *B25J 9/1684* (2013.01); *B25J 9/1687* (2013.01); *G06T 7/593* (2017.01); *G06T 7/73* (2017.01)

(58) Field of Classification Search
  CPC ...... B25J 9/1697; B25J 9/1612; B25J 9/1684; B25J 9/1687; B25J 5/02; B25J 9/0093; B25J 9/1602; B25J 9/1628; B25J 9/163; B25J 9/1653; B25J 9/1656; B25J 9/1661; B25J 9/1679; B25J 9/1664; B25J 11/0045; B25J 11/0095; B25J 19/021; G06T 7/593; G06T 7/73; G06T 7/10; G06T 7/12; G06T 7/50; G06T 7/55; G06T 7/11; G06T 7/136; G06T 2207/10028; G06T 2207/20112; G06T 2210/12; G06T 3/0031; B65B 25/001; B65B 25/22; B65B 43/46; B65B 35/16; B65B 5/105; B65B 35/36; B65G 47/90; G05B 2219/40079; G05B 2219/40537; G05B 2219/31028
  See application file for complete search history.

(56) References Cited

U.S. PATENT DOCUMENTS

| | | | | |
|---|---|---|---|---|
| 9,802,317 | B1* | 10/2017 | Watts | G05B 19/402 |
| 10,235,653 | B1* | 3/2019 | Stubbs | G06Q 10/087 |
| 2014/0147240 | A1* | 5/2014 | Noda | B25J 19/021 |
| | | | | 414/751.1 |
| 2018/0250820 | A1* | 9/2018 | Shimodaira | B25J 9/1669 |
| 2021/0069904 | A1* | 3/2021 | Duan | B25J 9/1653 |
| 2021/0122586 | A1* | 4/2021 | Sun | B07C 1/04 |
| 2021/0138655 | A1* | 5/2021 | Mousavian | B25J 13/08 |
| 2021/0229292 | A1* | 7/2021 | Liu | G06T 7/0004 |
| 2022/0016765 | A1* | 1/2022 | Ku | B25J 9/163 |
| 2022/0072707 | A1* | 3/2022 | Fan | G06T 7/73 |
| 2022/0161427 | A1* | 5/2022 | Yerazunis | B25J 9/1674 |
| 2022/0284216 | A1* | 9/2022 | Moreira Rodrigues | B25J 13/08 |

* cited by examiner

*Primary Examiner* — Abby Y Lin
*Assistant Examiner* — Esvinder Singh
(74) *Attorney, Agent, or Firm* — Kilpatrick Townsend & Stockton LLP

(57) ABSTRACT

An item identification and pose determination system is described for use in purposeful selection of items from a collection. The system may be configured to determine a pose of one or more items in a collection of items based on bounding box information associated with the item as well as depth data of the present location of the item. The bounding box is aligned to the depth data using a machine learning algorithm and randomized search algorithm and the pose of the item enables determination of grasp locations for removing the item from the collection and intentionally placing at a destination in a particular pose.

20 Claims, 10 Drawing Sheets

SYSTEMS AND METHODS FOR SCALABLE PERCEPTION AND PURPOSEFUL ROBOTIC PICKING OF ITEMS FROM A COLLECTION

BACKGROUND

Many modern day industries are beginning to rely more and more on robotic manipulators such as robotic arms. These robotic manipulators may function to increase repeatability of tasks, increase efficiency of production lines, and bring other benefits to their operators. Conventionally, robotic manipulators may be trained to grasp and move items through manual operation by human operators. Some training may also be performed by ingesting data describing how similar robotic manipulators successfully grasped different items.

Under operational conditions, typical robotic manipulator systems identify an item based on identifying marks and rely on detailed models of each item to determine a pose of each item. The pose of each item is used to select an appropriate grasp for grasping and moving the item. This typically requires the system to have access to three dimensional models of each item that may be encountered by the system, which may be difficult for scalability for systems that encounter a large variety of items. Depending on the complexity and orientation of the item, this approach can be resource and time intensive, especially due to the need to generate, store, and access each of the three dimensional models.

BRIEF DESCRIPTION OF THE DRAWINGS

Various embodiments in accordance with the present disclosure will be described with reference to the drawings, in which.

DETAILED DESCRIPTION

Figure 1:
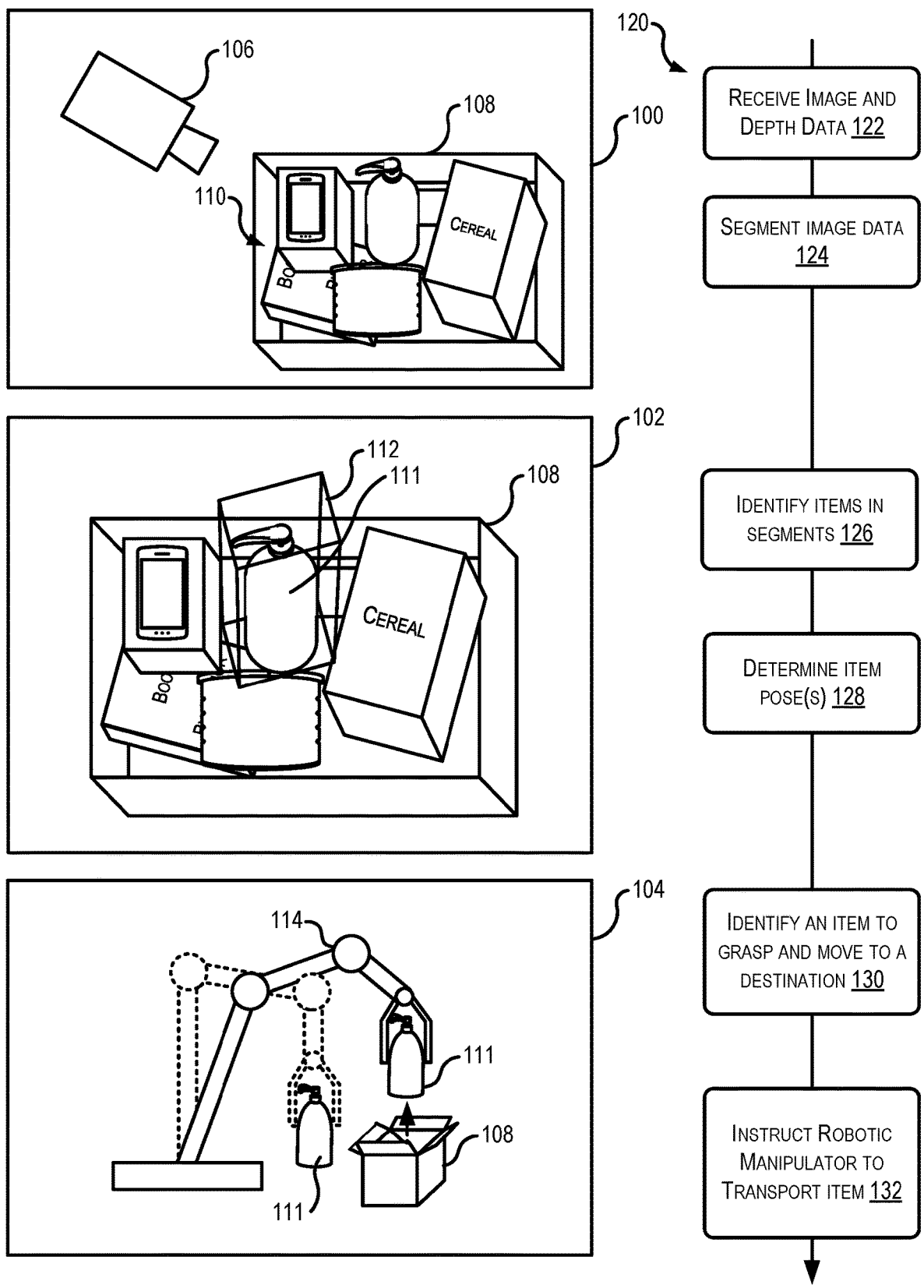
FIG. 1 illustrates an example series of processes and an example flow for item identification and pose determination from a collection of items in a container, according to at least one example.

Techniques described herein are directed to techniques for determining identities and poses of items in a collection of items and intentionally selecting items from the collection based on the identities and poses. In particular, the techniques are directed to a model-free pose estimation for items in a collection, such as in a container. The model-free pose estimation enables a manipulator system to determine a grasp position of the item as well as to intentionally pick items based on a need at a target location, such as to fit within a space of a target container. In some examples, the manipulator system relies on the model-free pose estimation to determine a final orientation of an item at a destination and grasp the item, or re-orient the item, such that the manipulator is capable of placing the item at the target in the desired orientation. Although described herein with respect to picking of items as part of an inventory management and fulfillment system, the examples and techniques described herein, for example including the model-free pose estimation, may be used in other environments where items are identified from a collection, including searching algorithms used in many different environments.

In some examples, robotic item picking technology to remove items from a container is well-known, but typically only involve simple tasks such as picking items from a container to another container or to a conveyor. The purpose behind these tasks do not require sophisticated perception and manipulations strategies. For more complex purpose driven tasks such as picking items to fulfill customer orders from a container of heterogeneous contents and/or for picking items for dense stowing and packing, more processing and computations are required to understand various attributes of each individual item such as shape, material property, spatial position and orientation (also known as pose) relative to other items. For example when picking items to fulfill customer order, the targeted item ordered by a customer is identified from a container of heterogeneous contents. Identifying the item may include identification and localization in clutter. Next, after identifying the item in the clutter, attributes of the targeted item such as shape, spatial position and orientation (e.g., pose) relative to other items and the container are determined to access pick-ability, avoid robot induced damage, and target location availability. Rather than relying on detailed models of each item to determine the pose within the container, depth data, in connection with the image data, is used in connection with bounding box information for each item. Each item is associated with a basic set of dimensions that describe a box that contains the item. Using those dimensions and the item identification in the image data, the bounding box may be placed on each item and oriented to fit using an algorithm. When the algorithm determines, to a threshold level of confidence, that the bounding box is placed in the correct pose, the pose of the item may be known. Next, based on the information gathered, manipulation strategies applicable to the state of the targeted item can be executed to pick the item and place in a specific, intentional manner. In some examples, further refinement of the estimation of attributes of the item can be completed after moving the item. In some examples, intentional decisions are enabled such that the manipulator is able to place the item at the destination, and may place the item to fit in a specific space and/or pose at the destination, such as to fill a target space within a destination container. Each item can be described in various levels of abstraction such as shape, dimensions, image, text, barcode, and other such identifiers.

In a particular example, a perception system, including a depth sensor and an image sensor is communicatively coupled with a robotic manipulator and a computing system capable of controlling one or more operations of a system.

The perception system gathers image and depth data of a container having multiple items inside. The contents of the container may be known, e.g., may include a contents listing, but may not be organized or arranged in any particular manner within the container. The attributes of each item, such as the bounding box dimensions for each item and one or more identifiers for each item are accessible from a database. A machine learning algorithm is used to segment the image data and identify different items. After segmenting, each segment may be associated with one item from the contents list. After an item is identified and localized, the dimensions and point cloud data from the depth sensor of the item are used for pose estimation. The pose estimation is model-free and uses only dimensions as prior inputs, not full three dimensional models. This method of pose estimation enables the algorithm to scale to any possible items from a service provider since it does not require a model of each item to function. The rich information extracted about the item from this perception system enables more intelligent grasping and manipulation strategies, for example to intentionally pick items and place at a destination in specific orientations to densely pack items at a destination.

The techniques described herein provide several advantages and benefits over typical robotic picking and manipulation systems, including some already described above. For example, the techniques described herein are scalable to a large variety and volume of items due to the mode-free pose estimation performed by the algorithm that does not require a three dimensional model. The model-free pose estimation additionally conserves computing resources as a pose may be determined based on a bounding box to above a threshold confidence level, and may not require computationally intensive matching of a model to depth data. The intentional picking of items and the increased processing speed for identifying items and item poses described herein results in increased throughput for the system and fewer intermediate item selections or movements, thereby reducing the number of touches on any particular item. This may additionally reduce a likelihood of item damage due to handling. Finally, intentional grasping, picking, and placement is enabled by the techniques herein due to the pose estimation data, items may be intentionally picked in a manner to ensure placement in a particular orientation and position at the destination is achieved, which may result in more efficient and dense packing of items at the destination.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an example series of processes and an example flow 120 for item identification and pose determination from a collection of items in a container that enables purposeful picking of items from the container, according to at least one example. The techniques described herein provide for model-free pose estimation of items and placement of items at a destination in an intentional and purposeful manner, such as to enable more dense packing of items at the destination while also increasing throughput of the system. Purposeful picking of items may relate to picking items intentionally for a specified purpose, such as to fulfill a need at a destination and also relates to picking of items in a particular pose or orientation such that the items can be accurately placed at the destination.

The first diagram 100 includes an image sensor 106 which may include a camera and/or a depth detection device. In some examples, the image sensor 106 may be enabled to gather image as well as depth data. In some examples, the image sensor 106 may gather image data while a separate sensor may gather depth data. In some examples, the image sensor 106 may include a stereo camera which enabled image and depth detection through a single device. The image sensor 106 is directed at a container 108 including a collection of items 110. The container 108 may be a bin used for collecting items for a customer order. The image sensor 106 collects image data of the container 108 as well as depth data which may be collected as a point cloud or any other data structure suitable for describing the depth to each of the collection of items 110.

At step 122 of process 120, the image and depth data is received at a computing device, such as a computing device of a service provider. The computing device may be a computing device serving as a facility management computing system for a sorting facility or may be any other suitable computing system described herein. At step 124, the computing device performs segmentation using a segmentation algorithm on the image data to segment the image data based on the different items of the collection of items, for example associating each item with a segment of the image segments.

At the second diagram 102, a representation of the image data gathered by the image sensor 106 is shown. The items of the collection of items 110 are identified within the image data at step 126. The items may be identified by viewing a visual marker, such as a bar code or other indicator, including a visual appearance of the item. In some examples, the collection of items 110 includes a particular set of items that is known, for example with the total contents of the container 108 recorder in a listing as the items were collected. Identifying the items may be performed by matching each of the segments of the image data against the visual markers and the visible portions of the items to particularly identify each item within the image data. Once each item is identified within the image data, and associated with item data stored in a database, the item data may be used to determine a pose of each item.

At step 128, the pose of one or more items may be determined. In the example of the second diagram 102, an item 111 is identified within the container. After being identified, data associated with item 111 is accessed from the database. The data may include the dimensions of a bounding box 112 that surrounds the item 111. The bounding box dimensions may generally be known and may be a rough measurement of a rectangular solid that encloses the item 111. In some examples more complex geometric bounding boxes may be used, such as cylindrical or irregular shaped bounding boxes. The bounding box may, in some example, be a bounding volume of any regular or irregular shape. The bounding box 112 is fit to the item 111 based on the image data and the depth data by a machine learning algorithm in combination with randomized search algorithms. The machine learning algorithm may output a confidence score for a number of different poses and positions of the bounding box 112 relative to the image and depth data describing the item 111. The pose may be determined based on the confidence score exceeding a threshold, indicative of the bounding box 112 being posed and placed, with a margin of error, over the item 111. The pose of the item 111 may therefore be determined based on the orientation of the bounding box 112.

In the third diagram 104, a manipulator 114 is shown that may be used to remove and re-position one or more items from the container 108. The manipulator 114 may include a grasping device and a multi-axis arm capable of positioning in a number of orientations and poses. At step 130, an item is identified for moving to a destination. The item may be identified based on a fulfillment listing for a shipping container at a destination, a requirement for a particular item, such as when sorting items by type or size, or may be selected based solely on a shape of the item. For instance, the item may be selected based on an available space at a destination and the item having a size and/or shape to fit within the available space while reducing or minimizing additional space, such that the item size or shape is the closest match to the available space of all the items of the collection of items 110 in the container 108. In some examples, the item to move may be an item that obscures an item stored beneath within the container 108 such that the item beneath is not identifiable or graspable until the obscuring item is removed. In such examples, the obscuring item may be removed to a buffer region to uncover the obscured item.

At step 132, the manipulator 114 is instructed to transport the item 111. The manipulator 111 may be instructed to place the item at the destination, for example in the available space described above or at the buffer region to uncover a target item in the container 111. The manipulator 114 may include a number of different graspers that may be selected based on one or more properties of the item being selected, for example to select between a grasper, suction device, hook, or other such device for grasping. The manipulator may be instructed to grasp at a grasping location that may be determined based on the pose of the target item and/or the arrangement of the collection of items 110. For example, when an item is partially obscured but is the target item for removal, the manipulator may be configured to grasp at an available location that is not obscured which may require grasping at a location that may not enable placement at the destination in the desired pose. In such examples, the item may be placed at the buffer region and re-grasped for accurate positioning at the destination. In this manner, the technique displayed in FIG. 1 provides for identification of the collection of items 110, determination of poses of each item in a streamlined and efficient manner, and selection and movement of items for placement at a destination to enable dense and efficient packing of items using efficient movements of the manipulator 114 to reduce transit time.

Figure 2:
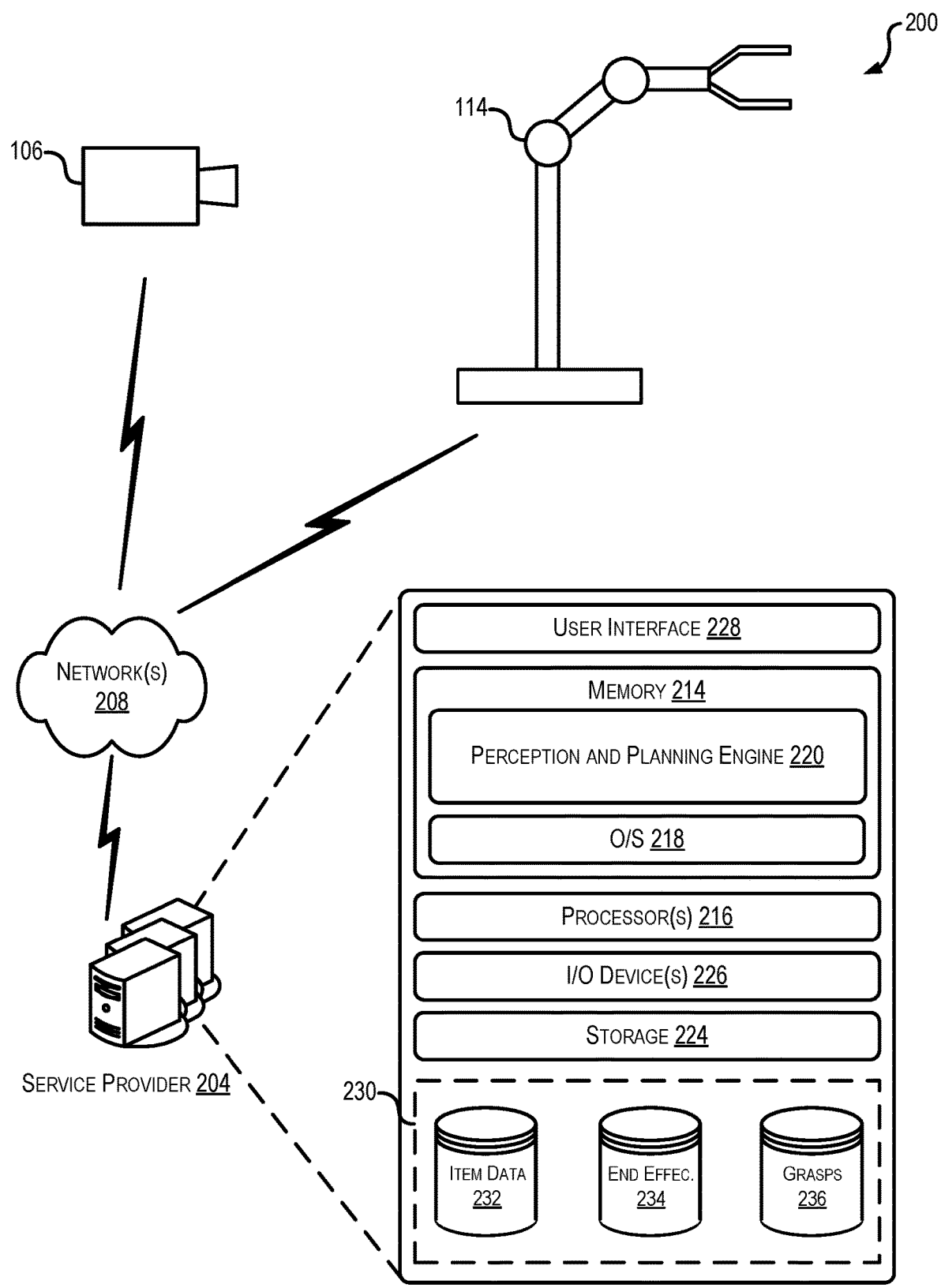
FIG. 2 illustrates an example system architecture for item and pose determination of items in a container for intentional item picking, according to at least one example.

FIG. 2 illustrates an example system architecture for item and pose determination of items in a container for intentional item picking, according to at least one example. The architecture 200 may include a service provider 204 that may include the computing device described as performing one or more of the tasks of FIG. 1. The architecture 200 may also include an image sensor 106 as described in FIG. 1, the manipulator 114, with each of the elements of the architecture 200 in communication via one or more networks 208 (hereinafter, "the network 208"). In some examples, the service provider 204 provides a user interface that enables a user to operate the manipulator 114. The network 208 may include any one or a combination of many different types of networks, such as cable networks, the Internet, wireless networks, cellular networks, and other private, and/or public networks.

The manipulator 114 may include a number of robotic elements (e.g., Cartesian robot, cylindrical robot, spherical robot, articulated robot, parallel robot, SCARA robot, anthropomorphic robot, and any other suitable robotic manipulator and/or robotic arm) and may also include any suitable type and number of sensors disposed throughout the robotic manipulator 114 (e.g., sensors in the base, in the arm, in joints in the arm, in the end effector, or in any other suitable location). The sensors can include sensors configured to detect pressure, force, weight, light, items, slippage, and any other information that may be used to control and/or monitor the operation of the manipulator 114, including the end effector. The sensors may be in communication with a management device that is local to the robotic manipulator and/or may be in direct communication with the service provider 204. In this manner, the management device may control the operation of the manipulator 114 and the end effector based at least in part on sensing information received from the sensors. The sensing information may also be used as feedback to adjust the grasps used by the end effector, to generate new grasps, to validate grasps, and to determine quality values for grasps, which may have numerical values based at least in part on one or more objective factors.

The service provider 204 may include one or more server computers, perhaps arranged in a cluster of servers or as a server farm. These servers may be configured to perform computing operations as described herein. In some examples, the servers (and the components thereof) may be distributed throughout more than one location. The servers may also be virtual computing resources. The service provider 204 may be implemented as part of an inventory management system that is associated with an electronic marketplace. Through the electronic marketplace users may place orders for items. In response, the inventory management system may determine shipping instructions for retrieving the items from their physical storage locations and coordinating their shipping. In some examples, the shipping instructions may be based on the inventory packing instructions. For example, a retrieval portion of the shipping instructions may include an inventory mapping of the packing locations for the items. The retrieval portion may be provided to the manipulator 114 for retrieval of the items. For example, the items may be retrieved from a storage structure and placed on a conveyor system or in a separate storage structure. As the manipulator 114 retrieves items as part of customer orders or otherwise, success metrics may be gathered and used to improve the set of grasps attempted by the manipulator 114 as part of retrieving the items or otherwise operating under actual operating conditions. In some examples, the service provider 204 may be implemented as a service within the inventory management system. In this manner the service provider 204 can access components of the inventory management system and easily share information with the inventory management system.

Examples of storage structures can include moveable storage structures coupled to mobile drive units, fixed storage structures, and any other structure capable of retaining items. In some examples, the storage structure may include a plurality of bins from which items may be removed by the manipulator 114 and/or to where items may be placed by the manipulator 114. The manipulator 114 may also be configured to remove items from conveyance structures and place items on conveyance structures.

The service provider 204 may include at least one memory 214 and one or more processing units (or processor(s)) 216. The processor 216 may be implemented as appropriate in hardware, computer-executable instructions, software, firmware, or combinations thereof. Computer-executable instruction, software, or firmware implementations of the processor 216 may include computer-executable or machine-executable instructions written in any suitable programming language to perform the various functions described. The memory 214 may include more than one memory and may be distributed throughout the service provider 204. The memory 214 may store program instructions that are loadable and executable on the processor(s) 216, as well as data generated during the execution of these programs. Depending on the configuration and type of memory including the service provider 204, the memory 214 may be volatile (such as random access memory (RAM)) and/or non-volatile (such as read-only memory (ROM), flash memory, or other memory). The memory 214 may include an operating system 218 and one or more application programs, modules, or services for implementing the features disclosed herein including at least a perception and planning engine 220. In some examples, the perception and planning engine 220 may be divided among several individual engines or modules. As described in detail herein, the perception and planning engine 220 may be configured to identify items in clutter and determine, using a model-free pose estimation, a pose of each item in the clutter for use in generating grasp strategies and intentional placement of items.

The service provider 204 may also include additional storage 224, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 224, both removable and non-removable, are examples of computer-readable storage media, which may be non-transitory. For example, computer-readable storage media may include volatile or non-volatile, removable or non-removable media implemented in any suitable method or technology for storage of information such as computer-readable instructions, data structures, program modules, or other data. As used herein, modules, engines, and components, may refer to programming modules executed by computing systems (e.g., processors) that are part of the service provider 204.

The service provider 204 may also include input/output (I/O) device(s) and/or ports 226, such as for enabling connection with a keyboard, a mouse, a pen, a voice input device, a touch input device, a display, speakers, a printer, or other I/O device.

The service provider 204 may also include a user interface 228. The user interface 228 may be utilized by an operator or other authorized user to access portions of the service provider 204. In some examples, the user interface 228 may include a graphical user interface, web-based applications, programmatic interfaces such as application programming interfaces (APIs), or other user interface configurations. The service provider 204 may also include a data store 230. In some examples, the data store 230 may include one or more data stores, databases, data structures, or the like for storing and/or retaining information associated with the service provider 204. For example, the data store 230 may include databases, such as an item database 232, an end effector database 234, and a grasp database 236.

The item database 232 may be configured to retain information about items available from the service provider 204 including at least the bounding box dimensions. The information in the item database 232 may be organized in any suitable manner to enable access by components of the service provider 204 such as the perception and planning engine 220. For example, the item database 232 may include an entry for each item that the service provider 204 may encounter. As a result, the item database 232 may include entries on a scale of hundreds of thousands or even millions. For each entry that corresponds to an item, the item database 232 may include the dimensions of the bounding box that surrounds the item for pose determination purposes. Each entry corresponding to an item may also include a class identifier that identifies a class of items to which the respective item belongs (e.g., bottles, square boxes, rectangular boxes, non-uniform boxes, books, televisions, plastic packaged, plush toys, computers, etc.), an item identifier that uniquely identifies the item (e.g., identifies a particular bottle of soda of brand A with respect to other bottles of soda of brand A) or uniquely identifies a subclass of the item (e.g., identifies an item as belonging to a subclass of brand A bottles in the class of bottles), possible end states of the item, affordances for the item and/or class of items, affordances associated with shape primitives that approximate the item, surface characteristics of the item (e.g., rough, slippery, smooth, etc.), and/or any other information. The possible end states may be precomputed based on likely interactions, uses, goals, and/or placements of the item. In some examples, a probability value may be assigned to each end state, which may be computed using a probability distribution function and added to the item database 232. For example, for a container of hand sanitizer that has a pump dispenser, a first state may include the container being positioned upright with the pump dispenser unobstructed, a second state may include the container being positioned upright with the pump dispenser obstructed, a third state may include the container being positioned with the pump dispenser facing downward, etc. Each of the first, second, and third state may be assigned a probability value such as 0.8 for the first state, 0.5 for the second state, and 0.3 for the third state. These values may indicate that the most likely end state for the container of hand sanitizer is the first state.

The item database 232 may also include entries including a description of the item, one or more stock images of the item, a surface model of the item or a link to the surface model of the item, a primitive shape model of the item or a link to the primitive shape item, a bounding box representation of the item, one or more actual images of the item (e.g., taken as it entered a facility), dimensions of the item (e.g., height, width, length), a location of a center of mass of the item, a total weight of the item, a three-dimensional image of the item, information about pose marker fiducials on the item or other identifiers of the item (e.g., unique characteristics of the item) that can be used to determine position and orientation of the item, and any other suitable of information related to the item.

The end effector database 234 may be configured to retain information associated with end effectors and other end of arm tools described herein that may be used with the manipulator 114. In some examples, information stored in the end effector database 234 may be organized according to different categories of end effectors and may include specification information for each end effector. This may include capacities of the end effectors in terms of amount of force, pressure, voltage, current, and geometric constraints, contact point constraints, and any other constraint. Any suitable end effector including any suitable grasping function may be included in the end effector database 234 and may be utilized in accordance with techniques described herein. A grasping function may define functionally how an end effector is capable of manipulating an item. The grasping function may differ between end effectors with respect to capacities, categories, and physical limitations. Example categories of end effectors include: soft robotic end effectors, vacuum end effectors, electro-adhesion end effectors, and mechanical or electromechanical end effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or ferrofluids (e.g., fluids having suspended ferro-magnetic particles capable of altering a size or shape of the fluid volume when subjected to a magnetic field). Vacuum end effectors may grasp items using suction. Electro-adhesion end effectors can include an array of electrodes arranged along a flexible or rigid substrate capable of applying a charge (akin to static electricity) that can adhere an item to the substrate portions that are in contact with the item. Mechanical or electromechanical end effectors may include pinchers, claws, grippers, or other rigid components that may be actuated relative to one another for grasping an item. Other end effectors may also be utilized to facilitate additional grasping functions.

The grasp database 236 may be configured to retain information about possible grasps for grasping items. The grasp database 236 may be configured to retain information about grasps that have been generated, taught, validated, attempted, or otherwise managed as described herein. For each grasp, the grasp database 236 may retain an end effector used for the grasp, an item or feature of an item associated with the grasp, one or more grasping surfaces on the item or feature of the item, contact points within the grasping surfaces where the arm tool may contact the item when executing the grasp, primitive shapes corresponding to features of the item, success rates for the particular grasp, an orientation of the item associated with the particular grasp, an orientation of an end effector with respect to the item associated with the particular grasp, and/or any other suitable information pertaining to a grasp. The grasp database 236 may be made accessible for other robotic manipulators operating under actual conditions. This may be done by making the grasp database 236 accessible via a cloud-based server, networked server, or in any other suitable manner. For example, robotic manipulators that handle inventory in one or more warehouses located throughout a geographic region can access the grasp database 236 simultaneously or copies of the grasp database 236 to search for appropriate grasps based on the conditions they encounter. Storage of the grasp information described herein in the grasp database 236 may improve the functioning of the service provider 204 by enabling quicker and more efficient searching of feasible grasps.

Figure 3:
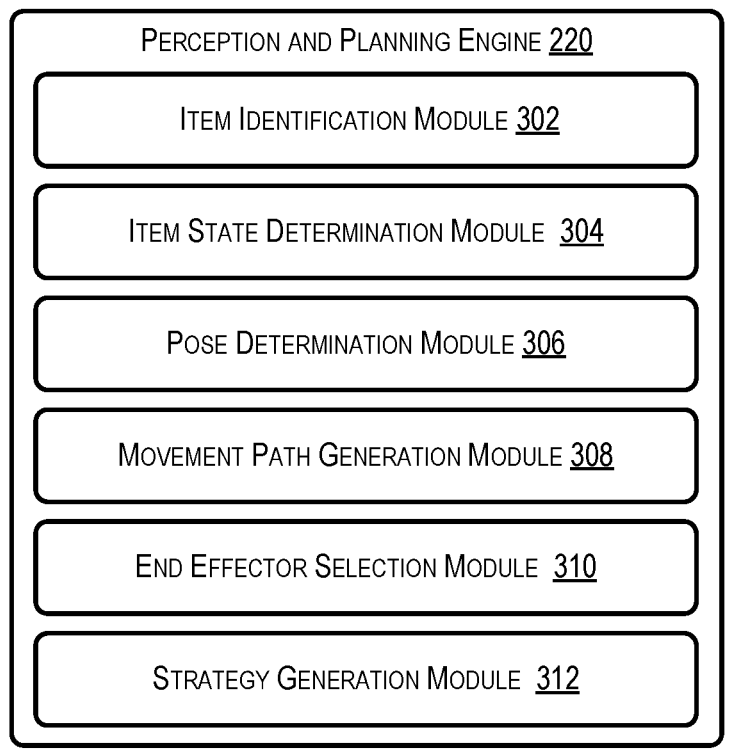
FIG. 3 illustrates an example engine for determining item identity and pose and actuating a grasping system, according to at least one example.

FIG. 3 illustrates an example identity identification engine 220 for determining item identity and pose and actuating a grasping system, according to at least one example. The item identification engine 220 may be configured to manage one or more sub-modules, components, and/or services directed to examples disclosed herein. In some examples, the item identification engine 220 may include an item identification module 302, an item state determination module 304, a pose determination module 306, a movement path generation module 308, an end effector selection module 310, and a strategy generation module 312. While these modules are illustrated in FIG. 3 and will be described as performing discrete tasks with reference to the flow charts, it is understood that FIG. 3 illustrates example configurations and other configurations performing other tasks and/or similar tasks as those described herein may be implemented according to the techniques described herein.

The item identification module 302 may be configured to access information about items in the item database 232. This can include, for example, general characteristics of the items and aspects of the items that are determined using the techniques described herein. For example, the item identification module 302 may be configured to instruct one or more image capture devices, such as the image sensor 106, to capture images of an item in order to identify the item from the images. In some examples, the images are provided and the item identification module 302 evaluates the images to identify the item from the images. In some examples, the item identification module 302 may segment the image data to identify different items in different segments of the image data. The processing performed by the idem identification module 302 can include using any suitable image processing technique capable of detecting items. In some examples, the item identification module 302 receives sensing information that identifies an item based on the sensing information. For example, a sensor may scan a barcode on the item and barcode information may be used by the item identification module 302 to identify the item. The output of the item identification module 302 may include multiple predictions that may be used for joint prediction in other modules.

The item state determination module 304 may be configured to determine state information for items. The state information may described item properties including initial state information that describes aspects of items in their initial states (e.g., before they have been interacted with by a robotic manipulator). The state information may also include final state information that describes aspects of items in their final states (e.g., after they have been interacted with by the manipulator 114). The state information may also include intermediate state information that describes aspects of items in states between their initial states and their final states. For example, initial state information for an item may indicate an initial position and an initial orientation of the item with respect to the manipulator 114. Final state information for the item may indicate a final position and a final orientation of the item with respect to the manipulator 114 and/or with respect to one or more additional items or objects at a destination. The intermediate states may indicate desirable and undesirable states between the initial states and the final states. In some examples, the intermediate states may include undesirable states. For example, an undesirable state that may result in the item being dropped or which may result in the item being damaged may be determined and avoided. In some examples, at least some of the state information is provided to the item state determination module 304, while at least some of the state information is generated by the item state determination module 304. The state information may depend on subsequent interactions with the item. For example, final states that enable the subsequent interactions may be flagged, assigned a higher probability, and/or otherwise noted.

The pose determination module 306 may be configured to determine pose information for the items in the container. The pose information may include initial pose information, intermediate pose information, and final pose information of an item before, during, and after transportation of the item by a robotic manipulator or other manipulation device. The pose information may be determined based on a machine learning algorithm placing a bounding box such that the item, as identified in the image and depth data, is enclosed by the bounding box associated with that particular item. In some examples the pose information may be determined based on a randomized search algorithm in connection with or in place of the machine learning algorithm. In such examples, the machine learning algorithm may compare each segment of the image data, and corresponding depth data against the corresponding bounding box, whose dimensions are accessed based on the item identification. After the item is identified and localized, such as by the item identification module, the dimensions of the item are obtained from the item database 232 and point cloud data of the depth data of the item are used for pose estimation. The pose estimation is model-free, as contrasted with typical model-based approaches that require a three dimensional model of each item. The pose estimation uses only dimensions of the bounding box associated with the item as an input. In some examples additional inputs may be provided, but do not require a three dimensional model as typical methods require. The depth data is used, by the pose determination module 306 to predict attributes of the item such as geometric properties and spatial relations of the item with other items. In particular, the bounding box dimensions for an item are retrieved and the bounding box is fit against the depth data. The algorithm may produce a confidence score associated with different orientations or poses of the bounding box with respect to the representation of the item in the depth data. The pose may be determined based on the confidence score exceeding a threshold. In some examples, the pose determination module 306 may perform a joint optimization of identification and pose estimation to align the bounding box and verify that the size of the item, from the depth data, corresponds, at least roughly, to the size of the bounding box and therefore confirms the identity of the item as determined by the item identification module 302. The items may be obscured or partially occluded, and the algorithm may focus on alignment of the bounding box or physical constraints of the bounding box, for example to ensure that visible portions of the item do not intersect a wall or edge of the bounding box to ensure alignment of the bounding box. The bounding box alignment may be selected from multiple outputs of the algorithm by selecting an alignment having a confidence score over a threshold, or in some examples, selecting a highest confidence score associated with a particular alignment.

The movement path generation module 308 may be configured to generate movement path information. The movement path information may define parameters of moving an item from an initial state to a final state such as from the initial location to the destination. The movement path information may also include parameters relating to the movement path (e.g., approach velocity, end effector pressure, removal velocity, angular rotation velocity, and other similar parameters relating to the movement path) and any other information for enabling the robotic manipulator to manipulate the item.

In some examples, the movement path includes a local trajectory (e.g., a set of transformations) according to which an end effector of manipulator 114 will move to move the item from the initial state to the final state and/or to move an initial pose to a final pose. The local trajectory may be learned for different classes of items. Thus, in some examples, the movement path generation module 308 may determine a movement path based at least in part on the class of item being manipulated. A convolution deep belief network (CDBN) may be used to learn and encode the transformations that make up the local trajectories using any suitable technique. For example, to develop training data, a set of labeled images can be used. The labeled images may include an oriented rectangle highlighting the area or part of the item for grasping and images of the final pose of the item. The goal of the learning may be to predict the oriented rectangle given a new image of the item, either seen before or never seen, for a grasp. By showing an image of a new item, the CDBN anticipates the final pose space, and subsequently predicts the area or part of the item to grasp in order to maximize coverage of the anticipated pose space.

The end effector selection module 310 may be configured to access information about end effectors described herein and select one or more end effectors for manipulating an item. To this end, the end effector selection module 310 may be configured to access the end effector database 234. The end effector selection module 310 may also be configured to access information identifying a particular end effector (or set of end effectors) available to the manipulator 114 to manipulate the item. The end effector selection module 310 may also be configured to determine a set of potential grasps corresponding to a particular end effector. In some examples, this may include accessing a set of predefined grasps that have been computed for the particular end effector. In some examples, this may include computing grasps based on the particular end effector, the item to be grasped, grasping parameters, a subsequent interaction, a final state, and any other suitable information.

The strategy generation module 312 may be configured to generate a grasping strategy based on one or more of the outputs from the other modules 302-310. The grasping strategy may include a set of instructions executable by the manipulator 114.

Figure 4:
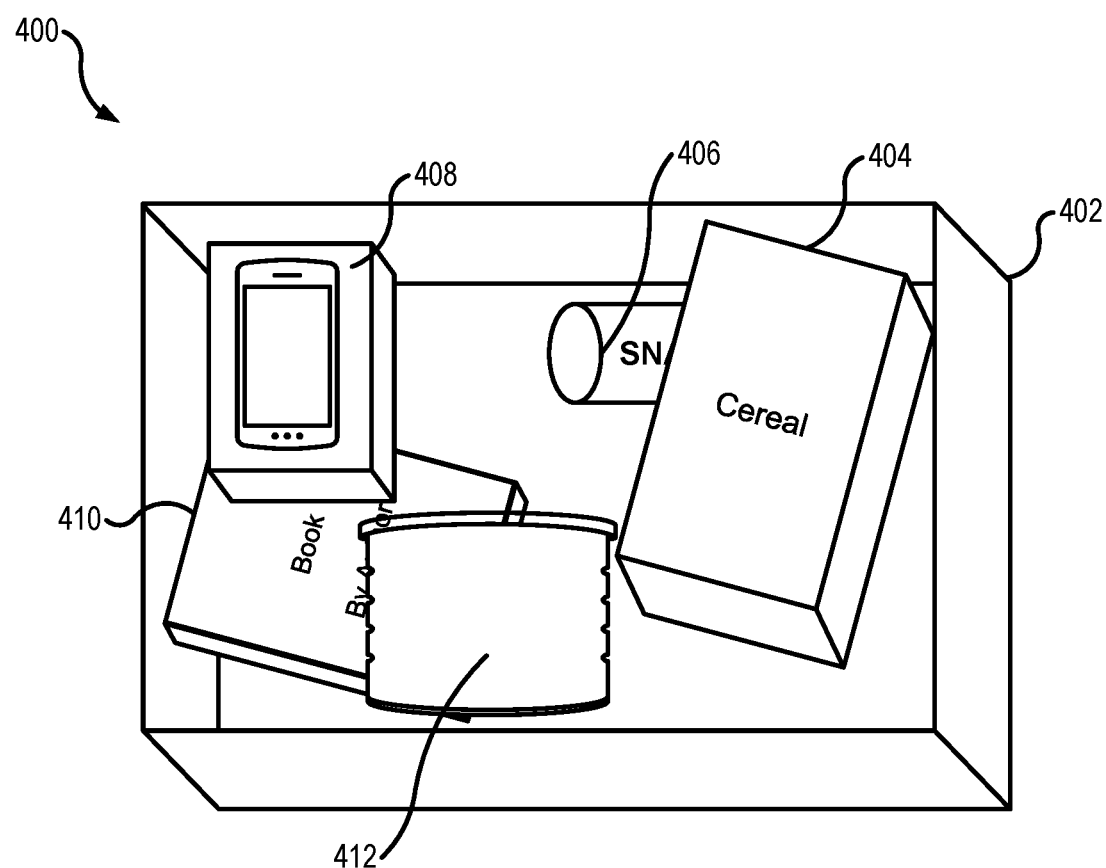
FIG. 4 illustrates an example view of a collection of items that may be segmented in image data and identified for processing and transfer, according to at least one example.

FIG. 4 illustrates an example view 400 of a collection of items that may be segmented in image data and identified for processing and transfer, according to at least one example. The view 400 may be representative of the image data and/or the combined image and depth data from the image sensor 106 after images are captured of the container 402. In some examples, the container 402 may be a container into which items are picked from a warehouse setting to fulfill a customer order. The container 402 may include a number of items 404, 406, 408, 401, and 412 that may each be different, e.g., of a different item type. The items 404, 406, 408, 401, and 412 are not organized but are within the container 402 with some items obscuring portions of other items. The image data shown in view 400 may be segmented by the item identification engine 220 to segment the image data into multiple segments, with each segment corresponding to a different item. The identities of each item shown in view 400 may not be known at the time of segmentation though a listing of items within the container 402 may be known. After segmenting, by the algorithm, each of the image segments may be matched or identified as corresponding to a particular item.

In some examples, the items are matched to segments based on visual markers such as barcodes, quick reference (QR) codes, and other such visual markers. In some examples, the items may be identified based on a comparison of visual appearance of the items known to be within the container 402 against each of the image segments. The image segments may be matched by performing an image comparison by an algorithm. In some examples, an item recognition algorithm may identify each item in the view 400 based on input data including visual markers, visual appearance, and the image segments from view 400. Following identification of the items in the view 400, each item is further identified with respect to the pose of the item, as shown in FIG. 5.

Figure 5:
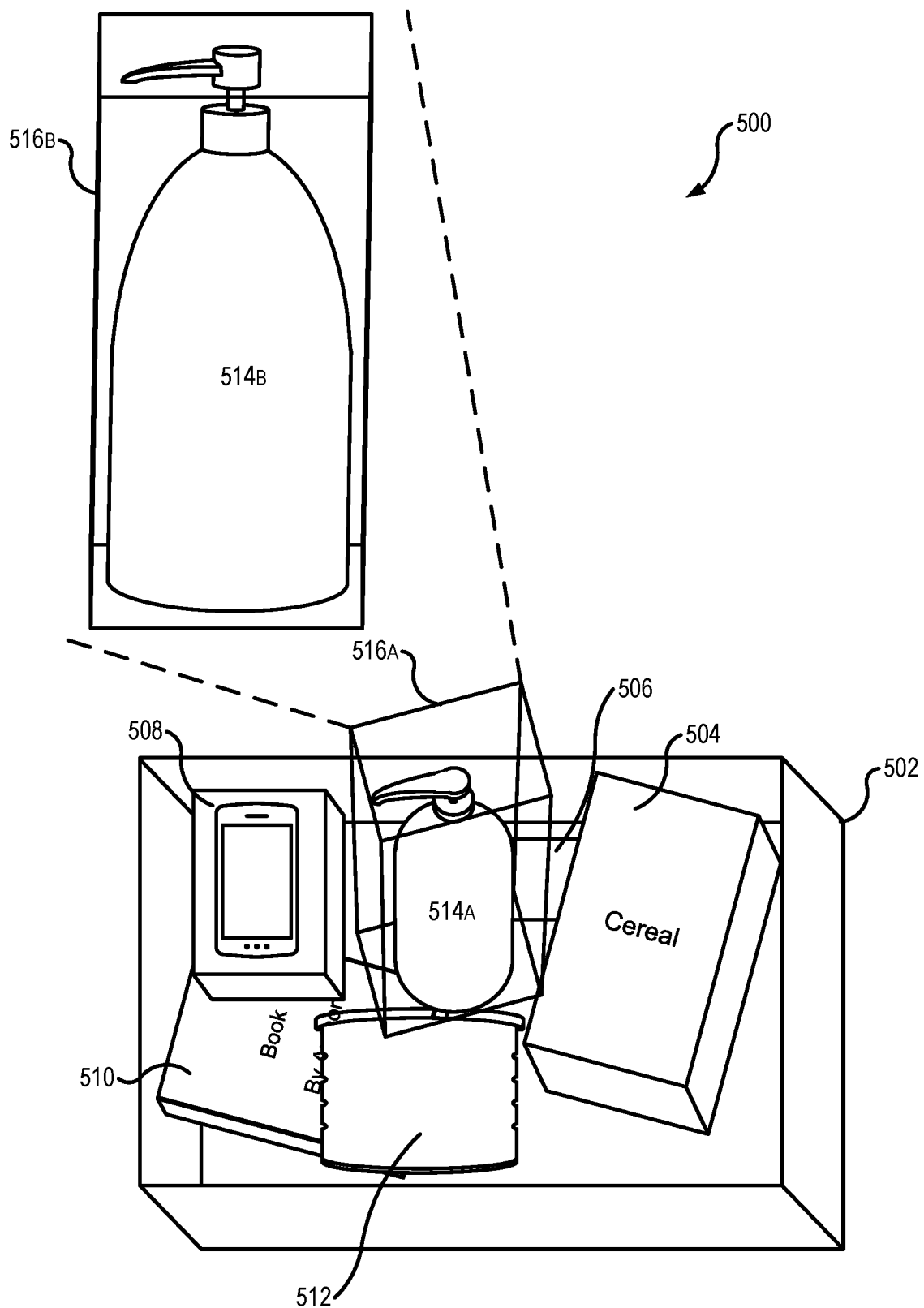
FIG. 5 illustrates an example view of a collection of items including a bounding box used to determine a pose of at least one item using depth data, according to at least one example.

FIG. 5 illustrates an example view 500 of a collection of items including a bounding box 516 used to determine a pose of at least one item 514 using depth data, according to at least one example. In the example view 500, which may be the combined image and depth data from the image sensor 106, several items 504, 506, 508, 510, 512, and 514a are included in a container 502. The items are identified, as described above such that the identity of each item is known. Once the identity of each item is known, bounding box dimensions may be accessed from the item database 232. The bounding box dimensions may represent the proportions of the bounding box 516b as illustrated in FIG. 5. The bounding box 516b has a length, width, and height that completely enclose the item 514b. The item 514b and the item 514a may share the same identity, e.g., are items of the same type. The bounding box 516b fits around the item 514b as shown, but if misaligned more than a small amount will result in one or more portions of the item 514b intersecting a wall or edge of the bounding box 516b. With such information, the perception and planning engine 220, may locate the bounding box 516a as shown with respect to the image and depth data of the container 502. The algorithm produces a confidence score representative of the confidence that the bounding box 516a is aligned with the item 514a. When the confidence score exceeds a threshold, the alignment may be accepted for further action and processing of the item. As shown, the item 514a may be at a different pose than images of the item 514b stored in the item database. As described herein, the pose estimate using the bounding box eliminates the need to fit a three dimensional model of the item, which requires having a three dimensional item for every possible item encountered, to the depth data to determine the pose of item 514a.

Figure 6:
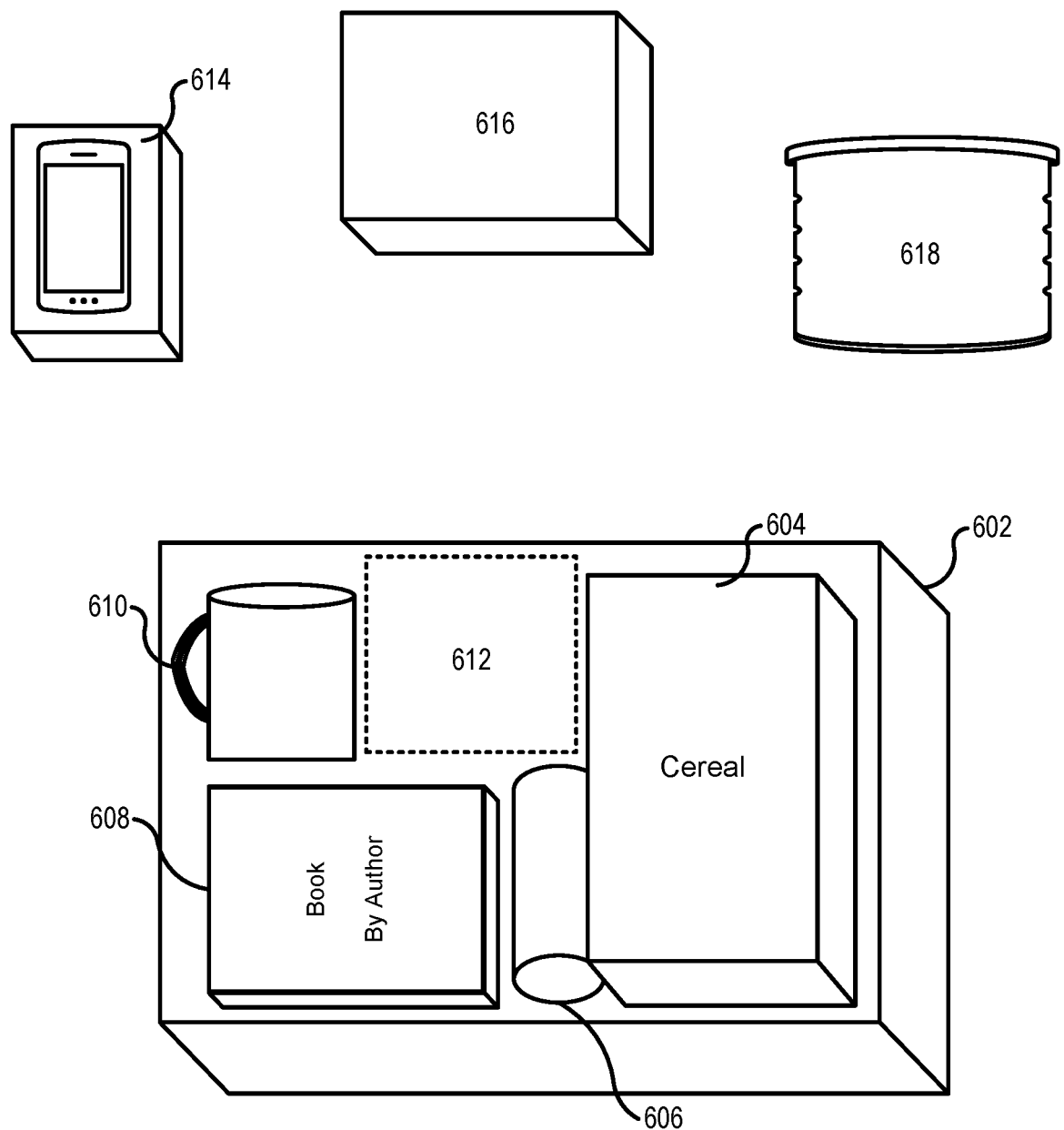
FIG. 6 illustrates an example view of a destination having an open region and a plurality of potential items to place at the destination, according to at least one example.

FIG. 6 illustrates an example view of a destination container 602 having an open region 612 and a plurality of potential items to place at the destination, according to at least one example. FIG. 6 illustrates a technique by which items may be selected from a source container for placement in the destination container 602. The pose information is useful for orienting the items to tightly pack and reduce open or wasted space in the destination container 602. The destination container 602 may be a storage or shipping container prepared to receive a number of items. The destination container 602 may include a number of items already placed, including items 604, 606, 608, and 610 while an open region 612 is ready to receive a further item. The open region 612 has a particular dimension and shape to fit in and around surrounding items. According to some examples described herein, a number of potential items that may be in a picking container (not shown) may be possible target items to add to the destination container 602. For example, the destination container may be a shipping container to fulfill a customer order. Typical systems may not accurately and purposefully or intentionally identify and place items in the destination container 602 based on available space in the open region. As such, the techniques described herein may identify the dimensions of the open region 612, such as based on image data or item data of surrounding items as well as their relative positions to one another. The open region 612 may be large enough to accommodate one or more items, such as potential items 614, 616, or 618. The techniques described herein may identify one of the potential items 614, 616, or 618 to fill the open region 612 based on the dimensions of the item (in a particular pose or orientation) to fill the open region 612 and reduce unfilled space in the destination container 602. In this manner, the potential items 614, 616, and 618 may be evaluated and selected intentionally from the source container for placement to densely pack or fill the destination container 602. This not only reduces open or wasted space in containers, but using the pose estimation data and the bounding boxes associated with the items, ensures that the reduction in open space does not increase processing or packing time, which may not be achieved through the use of model-based pose data.

Figure 7:
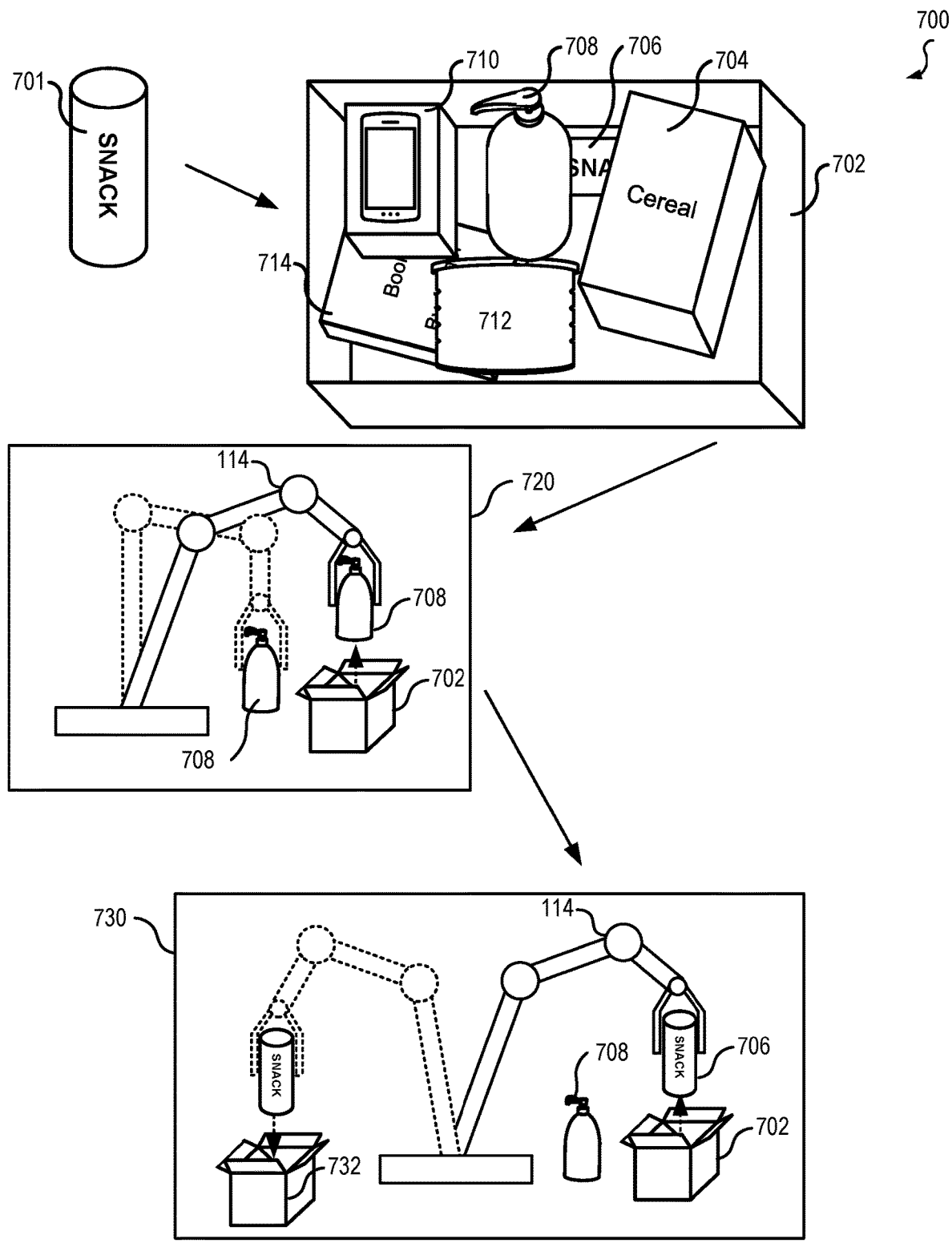
FIG. 7 illustrates an example flow for identifying a target item and accessing the target item by removing obscuring items to a buffer zone, according to at least one example.

FIG. 7 illustrates an example flow 700 for identifying a target item 701 and accessing the target item 701 from a container 702 by removing obscuring items to a buffer zone, according to at least one example. As illustrated, the flow 700 may begin by identifying a target item 701. The target item 701 may be identified based on a customer purchase list, a shape or available space in a container, such as shown in FIG. 6, or through any other selection criteria. The target item 701 may be a representation or item type of an item 706 stored within the container 702 that will be removed and transported. Once a particular item 706 from the container 702 is selected for movement to a destination, regardless of the selection criteria, the item must be identified and located within the container 702 among items 704, 706, 708, 710, 712, and 714.

The item 706 may be identified by gathering, using an image sensor 106, image data and depth data associated with the container 702. Within the image data, the item 706 may be identified based on a visual marker, appearance, shape, or other such identifying mechanism. As described above, the item 706 may be particularly identified and the pose of the item 706 may be determined based on bounding box information in a model-free pose estimation. The item 706 is obscured as depicted in flow 700 by item 708 such that the manipulator 114 may not be able to grasp the item 706 without first moving the item 708. This may be determined based on the pose information of the items within container 702. In some examples, the item 706 may not be identified with sufficient confidence, due to being obscured, or the computing system may not be able to determine the pose, again due to the item 706 being obscured. The computing system may therefore determine to remove an obscuring item to enable identity verification and pose determination of the item 706.

At frame 720, the manipulator 114 may grasp the item 708 and remove it to a buffer region. The buffer region may be a different region within the container or outside the container 702. The item 708 may be removed based on the computing system determining that the item 708 is obscuring the target item 706. The item 708 may be identified using the same techniques, to also determine a pose of item 708 and thereby determine a grasp position for the item 708 before actuating the manipulator 114 to remove the item 708 to the buffer region.

In some examples, the buffer region may be used to re-orient the item 708 or obtain a different grasp position on the item 708 to enable placement at a destination location in an orientation or pose that is not possible given available grasps of the item 708 as it rests in the container 702. In this manner, the buffer region may serve as an intermediate staging region before proceeding to the destination in addition to serving as a position to remove obscuring items to in order to access lower items in the container 702.

At frame 730, after removing the item 708, the target item 706 may be grasped by the manipulator 114 and removed to the destination 732. The destination 732 may be a shipping or storage container. After removing the target item 706, the item 708 may be returned to the container 702 or may be placed at any suitable destination. In some examples, the target item 706 may be re-grasped at the buffer region in a manner as described above, for example to enable placement of the target item 706 at the destination 732 in a particular orientation to ensure a tight packing or fit of items at the destination 732.

In some examples, one or more items within the container 702 may be deformable, such as flexible items, cloth items, and other such flexible and deformable materials. In such examples, the item identification and item pose may be updated after grasping the item with the manipulator 114, which results in changes to the size, shape, and/or pose of the flexible item. In such examples, additional sensors of the manipulator 114 may be used to refine item identification, shape, and pose information of an item selected by the manipulator. In some examples, the pose of the item with respect to the manipulator 114 may shift or change during grasping of the item by the manipulator 114. In some examples, grasping the item with the manipulator 114 may shift the item due to imperfections in modeling of contact forces and/or slippage of the manipulator/item interface. The updated information may be used to update item identification and/or pose determinations with the additional information, for example to increase the confidence score with respect to item identification and alignment of the bounding box. In some examples, an initial view of an item within the container 702 may be insufficient for determining an identity or a pose of the item, e.g., the identity determination may have a confidence score below a threshold or the pose determination may have a score below a threshold as well.

Figure 8:
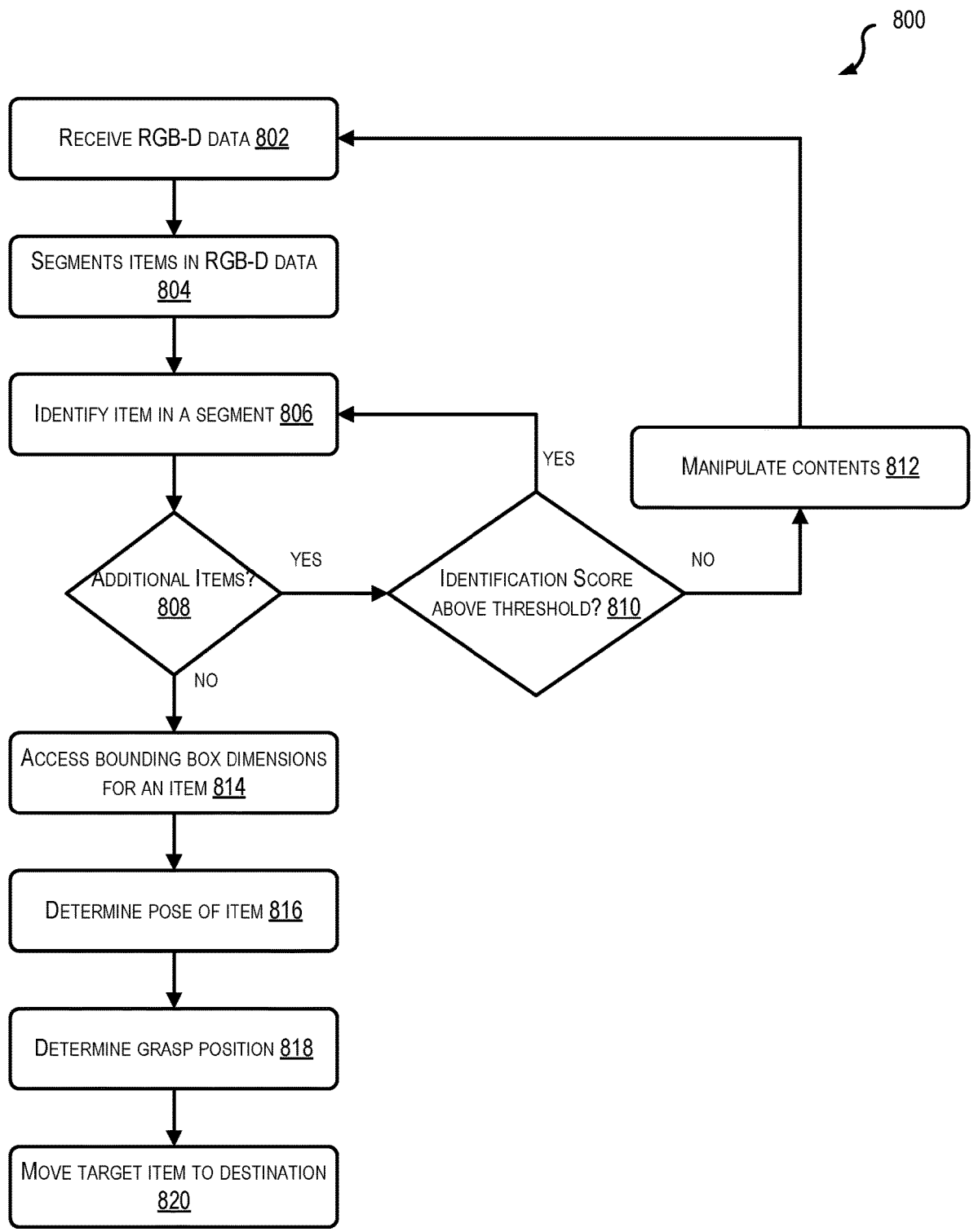
FIG. 8 illustrates an example flow diagram showing a process for intentional selection of items from a collection, according to at least one example.
Figure 9:
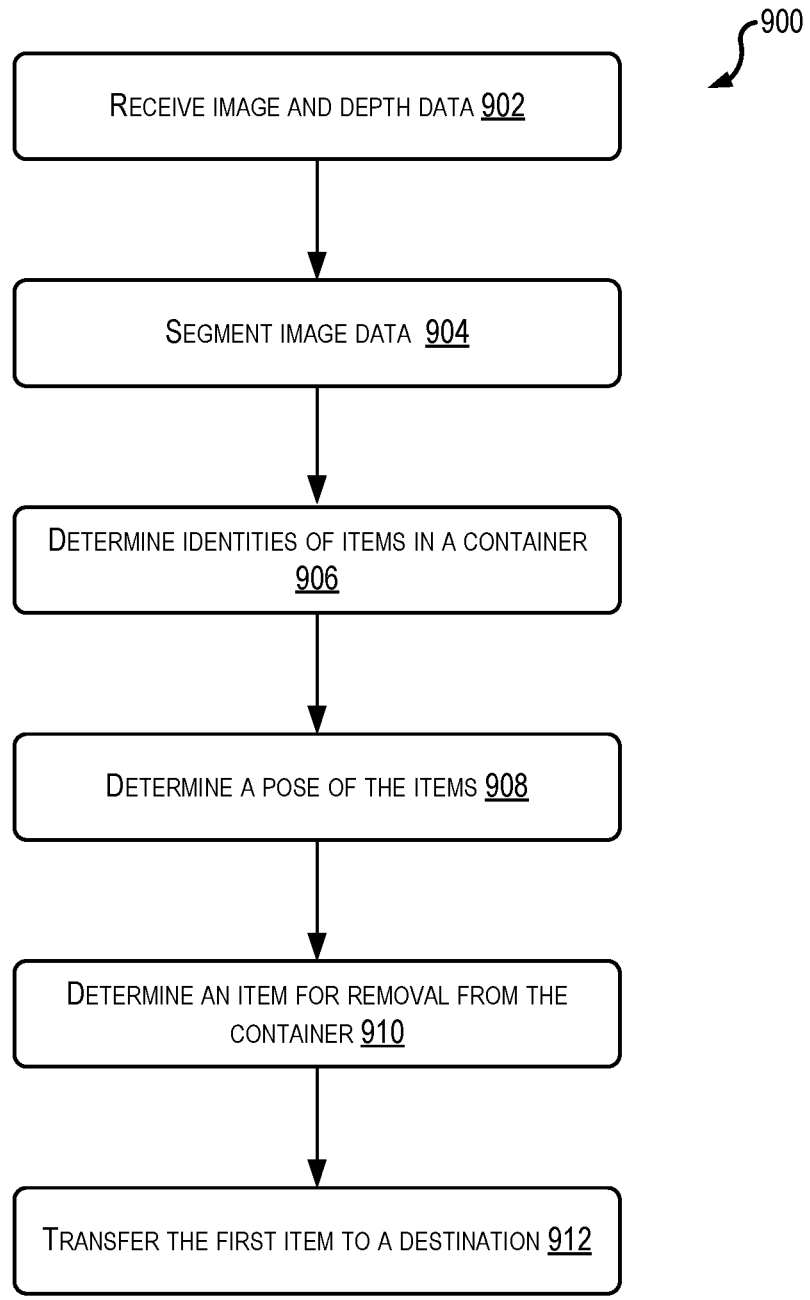
FIG. 9 illustrates an example flow diagram showing a process for identifying an item and a pose of the item in a collection, according to at least one example.

FIGS. 8 and 9 illustrate example flow diagrams showing respective processes 800 and 900 as described herein. These processes 800 and 900 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 8 illustrates an example flow diagram showing a process 800 for intentional selection of items from a collection, according to at least one example. The process 800 may be performed by a computing device, such as the service provider 204 of FIG. 2 or any other suitable computing device. The process 800 may be performed to select items from a container and includes determining an identity as well as a pose of the item for use in determining a grasp position and a final destination pose of the item.

The process 800 may begin at 802, by the computing device receiving image and depth data from the image sensor and/or a depth sensor. The image and depth data may be RGB-D data that includes the image and depth information or may be received separately. The data may be stored in a database and accessed by the computing device.

At 804, the image data is segmented by a segmenting algorithm to separate portions of the image data associated with different items in the container. The algorithm may be a machine learning algorithm trained using image identification data and may or may not identify the items, but distinguishes boundaries between items stored in the container adjacent one another, for example by identifying boundaries of items.

At 806, the process 800 includes identifying an item in a segment of the image data. The item may be identified by the perception and planning engine 220 as described herein including through the use of visual markers, container contents lists, visual appearance, or any other suitable identification method.

At 808, the process 800 includes determining if additional items are present in the container that have not yet been identified. The additional items may be identified by identifying image segments not yet associated with an item or by determining that one or more items of the contents list of the container are unaccounted for. If additional items are present, the process 800 proceeds to 810, if no additional items are present for identification then the process 800 proceeds to 814.

At 810, the process 800 includes determining whether an identification score of the additional item is above a threshold. For example, if a second item is unidentifiable due to another item obscuring the item or the item being in a particular orientation such that markers are not visible, then the process 800 proceeds to 812. When the second item is identifiable, such that an identification score output by the perception and planning engine 220 is above a threshold, the process 800 proceeds to 806 where the additional item is identified in a segment of the image data. The process 800 may continue iteratively in this manner until all items are accounted for and identified. In some examples, only visible items may be identified in this iterative manner, with obscured items identified after items are removed or shifted as needed.

At 812, the process 800 includes manipulating contents of the container. The contents may be manipulated to remove one or more items to a buffer region or to place one or more items at a destination, for example by packing items at a destination container before proceeding. After manipulating the contents in one or more ways, such as shifting locations of items, removing items, and the like, the process 800 proceeds to 802 where additional image and depth data is gathered following the movement of the items as the image and depth data will be different after the shifting of items is completed.

At 814, the process 800 includes accessing bounding box dimensions for an item. The bounding box dimensions may be accessed from the item database 232 based on the identification of the particular item. The bounding box information may be provided to the perception and planning engine 220 for determining a pose of the item.

At 816, the process 800 includes determining a pose of the item. The pose of the item is determined by aligning the bounding box, as accessed at 814, with the depth and image data of the item, as described herein. For example, The bounding box has a length, width, and height that completely enclose the item. The bounding box fits around the item, but if misaligned more than a small amount will result in one or more portions of the item intersecting a wall or edge of the bounding box. With such information, the perception and planning engine 220, may locate the bounding box with respect to the image and depth data of the container. The algorithm may produce a confidence score representative of the confidence that the bounding box is aligned with the item. When the confidence score exceeds a threshold, the alignment may be accepted for further action and processing of the item.

At 818, the process 800 includes determining a grasp position for grasping the item. The grasp position may be based on the pose of the item, the pose required to place the item at the destination, the type of end effector selected, and other such information including the parameters required for the manipulator 114. The grasp position may be determined by the movement path generation module 308, the end effector selection module 310, and the strategy generation module 312 as described above.

At 820, the process 800 includes moving the target item to a destination. This includes providing the move strategy and instructions for the manipulator to select an end effector, parameters for grasping including settings of the manipulator and end effector, as well as the grasp position determined at 818. The item is transferred, to a destination, buffer region, or otherwise moved in this manner.

FIG. 9 illustrates an example flow diagram showing a process 900 for identifying an item and a pose of the item in a collection, according to at least one example. The process 900 may include additional steps or may include steps performed in one or more different orders including simultaneous steps that may be performed in some cases.

The process 900 begins at 902 with receiving image and depth data. The image and depth data may be RGB-D data that includes the image and depth information or may be received separately. The data may be stored in a database and accessed by the computing device.

At 904, the process 900 includes segmenting the image data based on boundaries between items within the image and depth data. the image data is segmented by a segmenting algorithm to separate portions of the image data associated with different items in the container. The algorithm may be a machine learning algorithm trained using image identification data and may or may not identify the items, but distinguishes boundaries between items stored in the container adjacent one another, for example by identifying boundaries of items.

At 906, the process 900 includes determining identities of items in the container. The identities may be determined based on visual markers, appearance, contents of the container, or other known identification methods. This may include the identification scoring of 810 above, including determinations of the confidence of the identity of each item in the container.

At 908, the process 900 includes determining a pose of the items. The pose of the items may be determined using a model-free pose estimation. The pose estimation is performed by accessing bounding box dimensions for an item. The bounding box dimensions may be accessed from the item database 232 based on the identification of the particular item. The bounding box information may be provided to the perception and planning engine 220 for determining a pose of the item. The pose estimation then includes aligning the bounding box, with the depth and image data of the item, as described herein. For example, The bounding box has a length, width, and height that completely enclose the item. The bounding box fits around the item, but if misaligned more than a small amount will result in one or more portions of the item intersecting a wall or edge of the bounding box. With such information, the perception and planning engine 220 may locate the bounding box with respect to the image and depth data of the container. The algorithm may produce a confidence score representative of the confidence that the bounding box is aligned with the item. When the confidence score exceeds a threshold, the alignment may be accepted for further action and processing of the item.

At 910, the process 900 includes determining an item for removal from the container. The item to be removed from the container may be based on the identity of an item needed to fulfill a customer order or may be based on a shape of available space at a destination, as described with respect to FIG. 6 above. The item for removal may also be removed to a buffer region for re-posing to re-grasp or to provide access to one or more items obscured by the item selected for transfer.

At 912, the process 900 includes transferring the item to a destination. As described above, the destination may be a destination container with the item in a particular orientation, a conveyor system, a shipping container, a buffer region in or outside of the container, or any other suitable location The item is transferred by actuating a robotic manipulator or other actuation or motion device capable of removing the item and transferring to another location.

Figure 10:
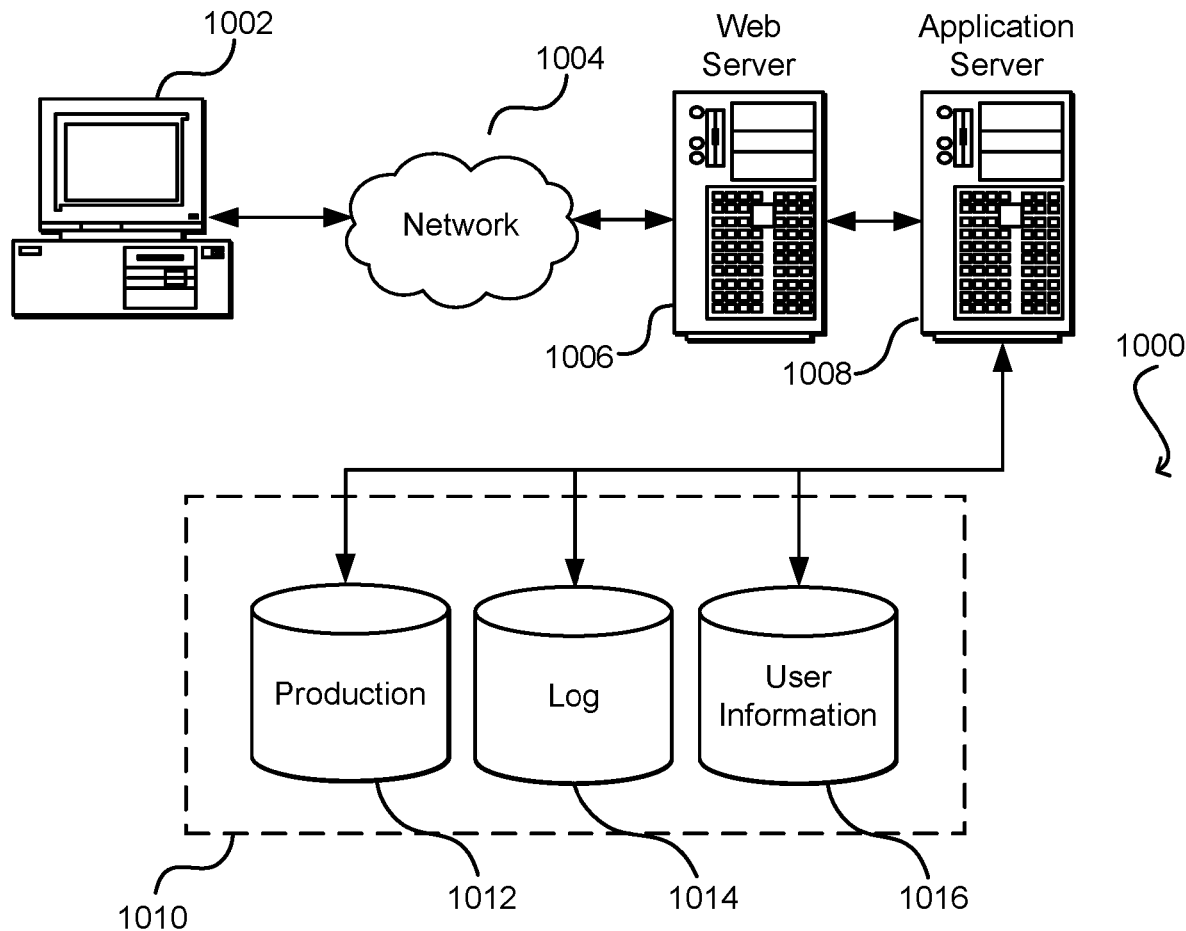
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for identifying and effecting transfer of items from a container, the computer-implemented method comprising:
   receiving image data from an image sensor representative of a plurality of items in a container;
   receiving depth data from a depth sensor representative of distances from the depth sensor to the plurality of items;
   segmenting representations of the plurality of items in the image data to generate segmented image data of each of the plurality of items;
   determining an identity and a pose of a first item of the plurality of items by at least performing a simultaneous joint estimation comprising:

generating an identity score for a first item of the plurality of items based on the segmented image data and container contents data describing contents of the container;

determining, based on the identity score exceeding a first threshold, an identity of the first item;

determining, based on the depth data and item dimension data corresponding to a predetermined bounding box of the first item, a pose of the first item in the container by at least aligning the predetermined bounding box with the depth data, the predetermined bounding box enclosing a volume of the first item;

updating, based on a confidence score of the alignment of the predetermined bounding boxes falling below a second threshold, the identity of first item; and updating the pose of the first item based on the updated identity;

determining, based on the pose of the first item, a grasping location on the first item; and actuating a grasping system to grasp the first item at the grasping location and transfer the first item to a destination.

2. The computer-implemented method of claim 1, wherein actuating the grasping system comprises transferring the first item to an intermediate position for re-grasping in a different position or to uncover a second item in the container.

3. The computer-implemented method of claim 1, further comprising selecting the first item for transferring to the destination based on the identity of the first item matching a requirement for an item.

4. The computer-implemented method of claim 1, further comprising selecting the first item for transferring to the destination based on the dimensions and pose of the first item matching a size and orientation requirement at the destination.

5. A computer-implemented method, comprising:

receiving image data with depth data representative of a plurality of items in a container;

segmenting the image data to identify each of the plurality of items;

determining an identity and a pose of each of the plurality of items by at least performing a simultaneous joint estimation comprising:

identifying a predetermined bounding box associated with each of the plurality of items, wherein each predetermined bounding box encloses a volume of an associated item of the plurality of items;

determining the pose of each of the plurality of items based on the identity of each of the plurality of items, dimensions of the predetermined bounding box for each of the plurality of items, and the depth data by at least aligning the predetermined bounding box for each of the plurality of items with the depth data;

updating, based on a confidence score of an alignment of a set of the predetermined bounding boxes falling below a threshold confidence score, the identity of the set of the plurality of items; and updating the pose of the set of the plurality of items based on the updated identity;

determining, based on the identity and pose of each of the plurality of items, a first item for removing from the container; and transferring, using a grasping system, the first item from the container to a destination.

6. The computer-implemented method of claim 5, wherein determining the identity of each of the plurality of items comprises matching each of the plurality of items to a contents list of the container.

7. The computer-implemented method of claim 5, wherein determining the pose of each of the plurality of items comprises accessing item data describing the dimensions of the predetermined bounding box and orienting the predetermined bounding box based on the depth data to match the pose of the item in the container.

8. The computer-implemented method of claim 5, wherein transferring the first item comprises adjusting a position of the first item to a buffer zone for re-grasping or to uncover a second item in the container for re-picking.

9. The computer-implemented method of claim 5, wherein determining the first item comprises determining an item identity based on an item listing.

10. The computer-implemented method of claim 5, wherein determining the first item comprises determining an item identity based on an available space at the destination and dimensions of a predetermined bounding box of the first item.

11. The computer-implemented method of claim 5, further comprising determining, based on the depth data a grasp position of the first item.

12. The computer-implemented method of claim 5, wherein transferring the item comprises:

receiving sensor data from one or more sensors of the grasping system; and updating at least one of the identity, the pose, or a confidence score associated with the identity or the pose based on the sensor data.

13. The method of claim 5, wherein identifying the predetermined bounding box comprises accessing item data defining the predetermined bounding box from a database.

14. The method of claim 5, wherein updating the identity and the pose of the set of the plurality of items is performed iteratively until the confidence score of the alignment of the set of the predetermined bounding boxes exceeds the threshold confidence score.

15. A system comprising:

an image sensor;

a depth sensor;

an actuation system; and a non-transitory computer-readable medium, having instructions stored thereon that, when executed by one or more processors, cause the one or more processors to:

receive image data from the image sensor representative of a plurality of items in a container;

receive depth data from the depth sensor corresponding to the plurality of items in the container;

segment the image data to identify each of the plurality of items;

determine an identity and a pose of each of the plurality of items by performing a simultaneous joint estimation comprising:

determine an initial identity of each of the plurality of items;

determine an initial pose of each of the plurality of items based on the initial identity of each of the plurality of items, dimensions of a predetermined bounding box that encloses a volume of an associated item of each of the plurality of items, and the depth data by at least aligning the predetermined bounding box for each of the plurality of items with the depth data;

updating, based on a confidence score of an alignment of a set of the predetermined bounding boxes falling below a threshold confidence score, the initial identity of the set of the plurality of items; and updating the initial pose of the set of the plurality of items based on the updated initial identity;

determine, based on the identity and pose of each of the plurality of items, a first item for removing from the container; and transfer, using the actuation system, the first item from the container to a destination.

16. The system of claim 15, wherein the actuation system comprises a grasper of a six axis robotic device.

17. The system of claim 15, wherein the image sensor comprises a stereo camera and the depth sensor is the stereo camera.

18. The system of claim 15, wherein the instructions to determine a pose of each of the plurality of items comprise further instructions that, when executed by the one or more processors, cause the one or more processors to additionally:

generate a confidence score based on a fit of the predetermined bounding box for each of the plurality of items; and determine a pose of each item based on the confidence score exceeding a threshold.

19. The system of claim 15, wherein the instructions to determine an identity of each of the plurality of items comprises further instructions that, when executed by the one or more processors, cause the one or more processors to match the segments of image data against representations of items stored within the container.

20. The system of claim 15, wherein the instructions to determine a first item for removing from the container comprise further instructions that, when executed by the one or more processors cause the one or more processors to additionally select the first item for removing from the container based on the identity of the first item matching a requirement for an item.

* * * * *